US012562570B2

(12) United States Patent
Messer

(10) Patent No.: US 12,562,570 B2
(45) Date of Patent: Feb. 24, 2026

(54) METHODS FOR OPERATING BATTERY FREQUENCY RESPONSE

(71) Applicant: KRAKEN TECHNOLOGIES LIMITED, London (GB)

(72) Inventor: Nathan Messer, Manchester (GB)

(73) Assignee: KRAKEN TECHNOLOGIES LIMITED (GB)

( * ) Notice: Subject to any disclaimer, the term of this patent is extended or adjusted under 35 U.S.C. 154(b) by 0 days.

(21) Appl. No.: 18/699,250

(22) PCT Filed: Oct. 13, 2022

(86) PCT No.: PCT/GB2022/052608
§ 371 (c)(1),
(2) Date: Apr. 5, 2024

(87) PCT Pub. No.: WO2023/062376
PCT Pub. Date: Apr. 20, 2023

(65) Prior Publication Data
US 2024/0413637 A1 Dec. 12, 2024

(30) Foreign Application Priority Data
Oct. 13, 2021 (GB) .................................... 2114660

(51) Int. Cl.
*H02J 3/24* (2006.01)
*H02J 3/32* (2006.01)
*H02J 7/00* (2006.01)

(52) U.S. Cl.
CPC ............... *H02J 3/241* (2020.01); *H02J 3/32* (2013.01); *H02J 7/0014* (2013.01); *H02J 7/0048* (2020.01)

(58) Field of Classification Search
CPC ...... H02J 7/0047; H02J 7/0048; H02J 7/0049; H02J 7/005; H02J 3/241; H02J 3/32; H02J 7/0014; H02J 3/28; H02J 3/322
See application file for complete search history.

(56) References Cited

U.S. PATENT DOCUMENTS

2013/0320772 A1* 12/2013 Qiao ................. H01M 10/4207
307/85
2015/0021991 A1* 1/2015 Wood ........................ H02J 3/32
307/23

(Continued)

FOREIGN PATENT DOCUMENTS

CN 108092352 B 12/2019
CN 116529978 A 8/2023

(Continued)

OTHER PUBLICATIONS

Search Report for GB2204200.6 dated May 24, 2022.
Search Report for GB2114660.0 dated Nov. 17, 2022.
Search Report for GB2405786.1 dated May 28, 2024.

*Primary Examiner* — John W Poos
(74) *Attorney, Agent, or Firm* — Michael Henson; Maynard Nexsen PC

(57) ABSTRACT

The present disclosure relates to computer-implemented method of operating a battery for providing frequency response to a power grid, the battery comprising a plurality of containers each configured to store electrical energy, the method comprising, for a given container: determining a container target response by dividing a system target response by the plurality of containers; determining a container capacity by dividing a battery capacity by the plurality of containers; determining a state-of-charge offset between an average state of charge across the plurality of containers and a state of charge of the given container; determining a response adjustment by multiplying the container capacity (Continued)

by the state-of-charge offset; and determining a response for the given container by adjusting the container target response by the response adjustment.

20 Claims, 3 Drawing Sheets

(56)                    References Cited

U.S. PATENT DOCUMENTS

| | | |
|---|---|---|
| 2016/0079778 A1 | 3/2016 | Howe |
| 2016/0352111 A1 | 12/2016 | Arita et al. |
| 2018/0031641 A1* | 2/2018 | Drees ................... H01M 10/486 |
| 2018/0123357 A1* | 5/2018 | Beaston ................. H02J 3/381 |
| 2018/0352111 A1* | 12/2018 | Bai .................... H04N 1/32251 |
| 2021/0194025 A1* | 6/2021 | Ichikawa ............ H01M 10/425 |
| 2021/0376629 A1 | 12/2021 | Chen et al. |

FOREIGN PATENT DOCUMENTS

| | | |
|---|---|---|
| JP | 2015019538 A | 1/2015 |
| KR | 101923958 | 11/2018 |
| WO | 2021173136 A1 | 9/2021 |

* cited by examiner

S201

Measure state of charge of the given container at t1, t2, …tn over time period T

S202

Determine average state of charge over time period T

B

S301

Determine number of operating
containers N

S302

Scale system target response by N

A

METHODS FOR OPERATING BATTERY FREQUENCY RESPONSE

FIELD OF THE INVENTION

The present disclosure relates to operation of batteries. In particular, the present disclosure relates to the provision of frequency response to a power grid by a battery.

BACKGROUND

Due to the shift towards increased utilisation of renewable energy sources (RESs) in the form of wind and solar, the power grid is increasingly required to manage intermittent sources with variable output. Energy storage systems (ESSs) can be integrated with RESs that are linked to the power grid to meet the requirement for increasing reserves in order to manage the uncertainty and output variability of renewable energy generation, so as to maintain a safe grid operation and to balance demand and supply. ESSs can also be used independently of RESs. ESSs perform an important task of storing energy that has been generated in excess then making it available during suboptimal generating conditions or peak energy demand. Improvements in energy storage technologies and power electronics, coupled with these changes in the electricity market, lead to an increasing reliance on ESSs as a cost-effective energy resource. Among ESSs, battery energy storage system (BESS) is one of the most suitable candidates for grid-scale applications as BESSs offer rapid active power response, being suitable to compensate for the fluctuations generated by RESs and demand usage.

Balancing the demand for and generation of energy to maintain a system frequency close to a nominal frequency (e.g 50 Hz for the UK) is a critical issue in power system operation and control. The nature of renewable energy generation can lead to power fluctuation on the generation side and can reduce the system inertia, which can contribute to frequency stability issues.

In general, a battery which provides a frequency response service to a system operator comprises a plurality of containers. When a battery is instructed to provide a service, it is generally assumed that a generic battery state-of-charge (SoC) represents the SoC of each container in the plurality. As a result, when the battery is required to import (charge) or export (discharge) power, requests to import power to or export power from the plurality of containers are not differentiated amongst individual containers.

Different containers in a battery may diverge, for example due to minor failure or inefficiencies of some components, e.g., inverters or battery cells. The conventional approach therefore lacks a mechanism to encourage the SoC of the plurality of containers in a battery to converge to a common SoC. This can lead to one or some of the containers of the plurality reaching their upper or lower limits, such that they cease importing or exporting power, while the battery SoC (i.e. the average across all containers) is below the upper limit or above the lower limit, resulting in errors in the response of the battery as one or more containers fail to respond. Further, when monitoring logic is configured to interpret a failure of one container as a failure of the whole battery (as is required for some services), this leads to an "outage" of the battery even when some containers are within their operation limits. Such an outage is undesirable as it may place extra burden on other elements of the system and could result in a penalty for the service operator for non-delivery of a service. Moreover, frequent outages can lead to the service becoming unpredictable and unreliable. This could result in the battery being disqualified from being able to provide the service.

It is therefore desirable to provide improved methods for operating a battery for the provision of frequency response to a power grid.

BRIEF DESCRIPTION OF THE DRAWINGS

Embodiments will now be described, with reference to the accompanying drawings, in which.

DETAILED DESCRIPTION

Figure 1:
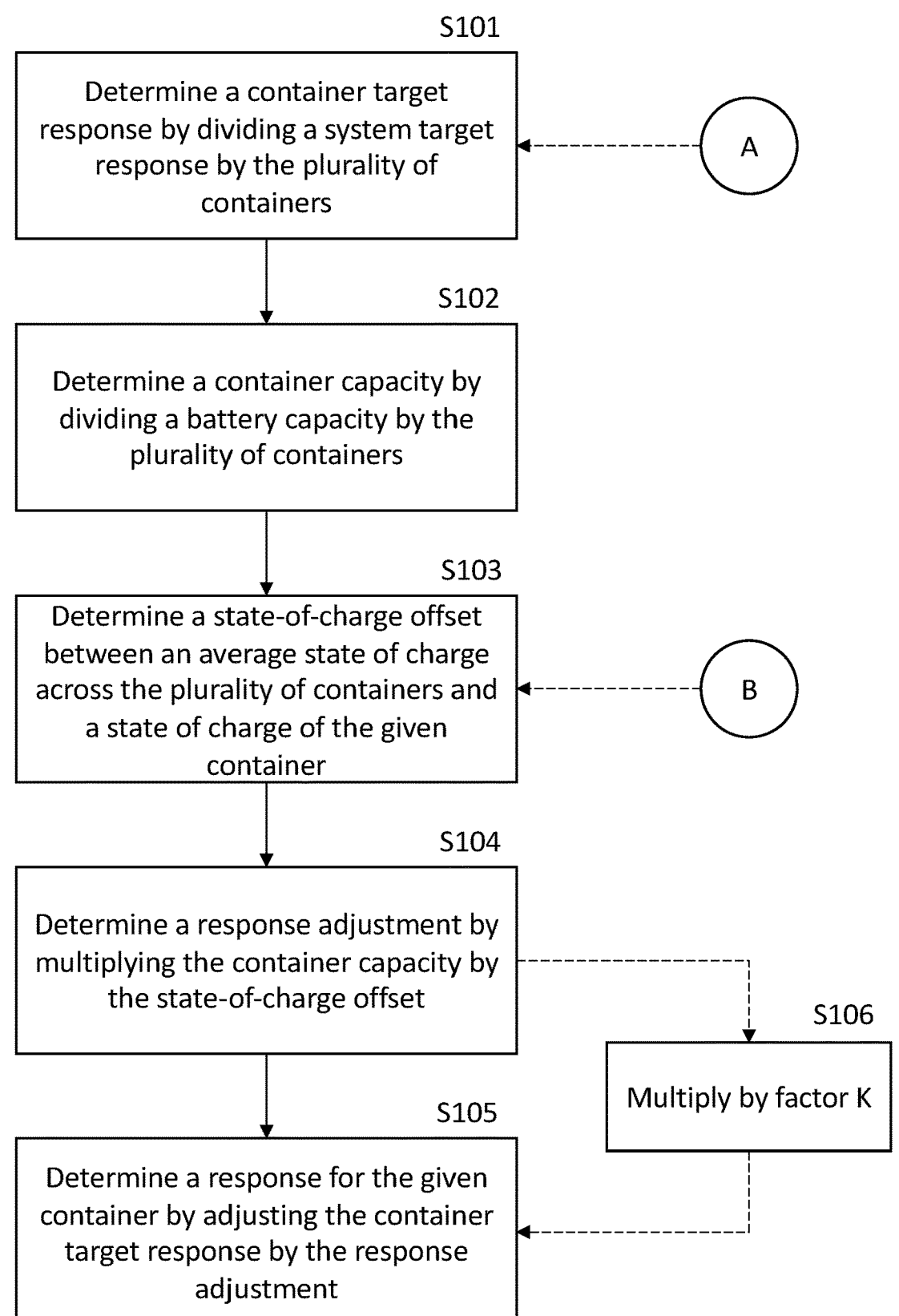
FIG. 1 shows an exemplary method for operating a batter for frequency response according to an embodiment.

The present technology provides a computer-implemented method of operating a battery for providing frequency response to a power grid, as shown in FIG. 1, wherein the battery comprises a plurality of containers each configured to store electrical energy. The method comprises, for a given container: at S101, determining a container target response by dividing a system target response by the plurality of containers; at S102, determining a container capacity by dividing a battery capacity by the plurality of containers; at S103, determining a state-of-charge offset between an average state of charge across the plurality of containers and a state of charge of the given container; at S104, determining a response adjustment by multiplying the container capacity by the state-of-charge offset; and at S105, determining a response for the given container by adjusting the container target response by the response adjustment.

Techniques describe herein thus enable a battery with a plurality of containers to operate efficiently based on the state of individual containers so as to provide an effective frequency response service to a power grid through tailoring the response of a container based on its current state with respect to other containers of the battery. As such, techniques described herein enable the battery to be operated effectively and reduce the likelihood of whole battery outage.

In some embodiments, determining a response adjustment may further comprise, at S106, a multiplication by a factor K.

In some embodiments, the factor K may be determined by parameters of the battery.

In some embodiments, when the response for the given container is above an upper limit or below a lower limit, the factor K may be adjusted until a resulting response for the given container is within the upper and lower limits.

In some embodiments, the upper limit may correspond to a state at which the given container is fully charged, and/or the lower limit may correspond to a state at which the given container is fully discharged.

In some embodiments, the response for the given container may comprise a rate at which the given container is charged or discharged, wherein a negative value of the response may correspond to charging while a positive value of the response corresponds to discharging.

In some embodiments, the method may further comprise first comparing a state-of-charge range of the plurality of containers with a predetermined threshold, wherein the state-of-charge range of the plurality of containers may be determined by a difference between a highest state of charge and a lowest state of charge amongst the plurality of containers.

In some embodiments, upon determining that the state-of-charge range of the plurality of containers is below the predetermined threshold, the response for every container of the plurality may be set to be the same.

In some embodiments, upon determining that the state-of-charge range of the plurality of containers is above the predetermined threshold, the response for each container of the plurality may be set using the method.

In some embodiments, the state of charge of the given container may be determined by averaging a plurality of instantaneous state-of-charge values of the given container measured at a predetermined time interval over a predetermined time period.

In some embodiments, the method may further comprise implementing an outage-handling strategy to scale the response for the given container when one or more containers of the plurality fail.

In some embodiments, the outage-handling strategy may comprise down adjusting the system target response proportionate to a number of functioning containers.

In some embodiments, the method may further comprise setting an expected number of containers, and, upon determining that the plurality of containers is below the expected number of containers, down adjusting the system target response proportionate to the plurality of containers.

Another aspect of the present technology provides a computer-readable medium comprising machine-readable code, which, when executed by a processor, causes the processor to perform the method as described above.

A further aspect of the present technology provides a control device for operating a battery for providing frequency response, comprising: at least one processor; and a non-transitory computer-readable medium having stored thereon software instructions that, when executed by the at least one processor, cause the device to: determine a container target response by dividing a system target response by the plurality of containers; determine a container capacity by dividing a battery capacity by the plurality of containers; determine a state-of-charge offset between an average state of charge across the plurality of containers and a state of charge of the given container; determine a response adjustment by multiplying the container capacity by the state-of-charge offset; and determine a response for the given container by adjusting the container target response by the response adjustment.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

In general, embodiments of the present technology provide methods for determining how a battery with a plurality of containers operate in order to charge and to provide frequency response for a power grid. The methods can be summarised by:

$$\text{Response} = \frac{\text{battery target response}}{\text{number of containers}} + k*$$
$$\left[ (\text{average } soc - \text{container } soc) * \frac{\text{battery capacity}}{\text{number of containers}} \right]$$

where soc denotes state of charge, and K is a value defined by the parameters that characterise the battery and can be adjusted if desired and required. An embodiment of the present method is shown in FIG. 1.

It should be noted that K can equal to 1 if no correction is required. "Response" refers to a rate at which a given container of the battery is to be charged or discharged. In some embodiments, "Response" may refer to an amount by which a given container of the battery is to be charged or discharged. When "Response" is a negative value, it corresponds to the given container charging. When "Response" is a positive value, it corresponds to the given container discharging.

Thus, according to present methods, if the state of charge (e.g. as a percentage or a fraction) of a given container is above the average state of charge across all the containers of the battery, the given container is set to charge less or discharge more. On the other hand, if the state of charge of the given container is below the average state of charge across all the containers, the given container is set to charge more or discharge less.

In some embodiments, if the response of a given container as determined by the method results in the given container exceeding its upper limit or dropping below its lower limit, the factor K may be adjusted in order to adjust the value of the response to ensure that the given container operates within its upper and lower limits. The upper limit may for example correspond to a state at which the given container is fully charged. The lower limit may for example correspond to a state at which the given container is fully discharged.

There may be occasions when it is preferable to not apply the present method for determining a container response, for example when the state of charge of each container of the battery deviates from the average state of charge only by a small amount and the adjustment made through application of the present method becomes insignificant, or the application of the present method becomes inefficient. Thus, in some embodiments, a predetermined threshold "entryDeadbandSocRange" can be set, such that when the range of the state of charge of the plurality of containers is below the predetermined threshold "entryDeadbandSocRange", the response for each container of the battery is set to be the same, for example a container target response that is the system target response divided by the number of containers in the battery. When the range of the state of charge of the plurality of containers is above the predetermined threshold "entryDeadbandSocRange", the response for each container of the battery can then be adjusted to the response as determined by the present method. In some embodiment, a separate threshold "exitDeadbandSocRange" for the range of the state of charge of the plurality of containers may be set, above which the response for a given container is determined by the present method. Herein, the range of the state of charge (state-of-charge range) of the plurality of containers may, for example, be determined by a difference between the highest state of charge and a lowest state of charge amongst the plurality of containers.

Figure 2:
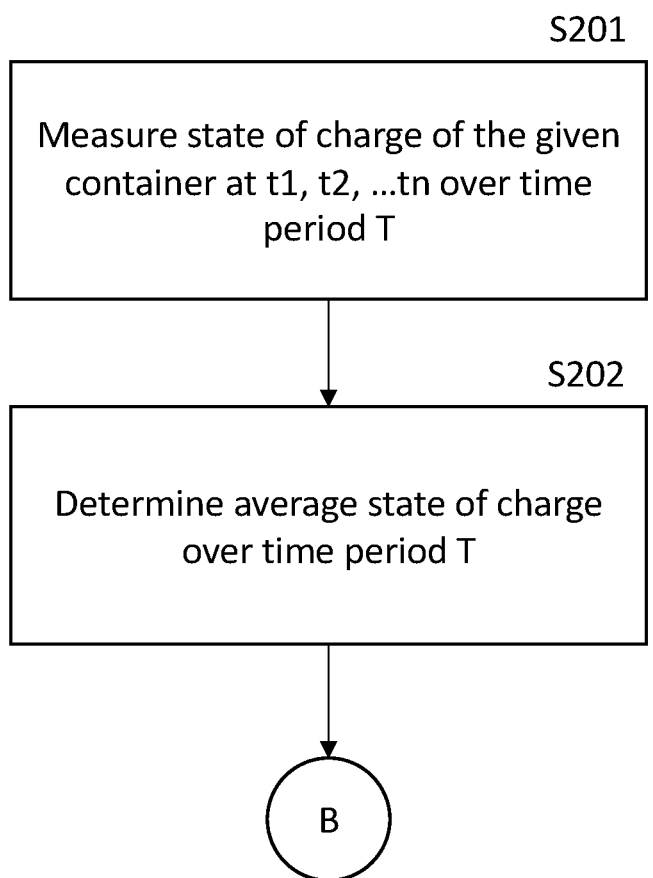
FIG. 2 shows an exemplary method for determining a system target response.

In some embodiments, a time-averaged state of charge may be used as the state of charge of a given container of the battery, as shown in FIG. 2. For example, the time-averaged state of charge of the given container may be determined by averaging, at S202, a plurality of instantaneous state-of-charge values of the given container measured, at S201, at various time points or at predetermined time intervals over a predetermined time period "deviceEnergySampleFrame-Seconds". Using a time-averaged state of charge has a smoothing effect, where a longer time period "deviceEner-gySampleFrameSeconds" corresponds to smoother correction adjustments.

Figure 3:
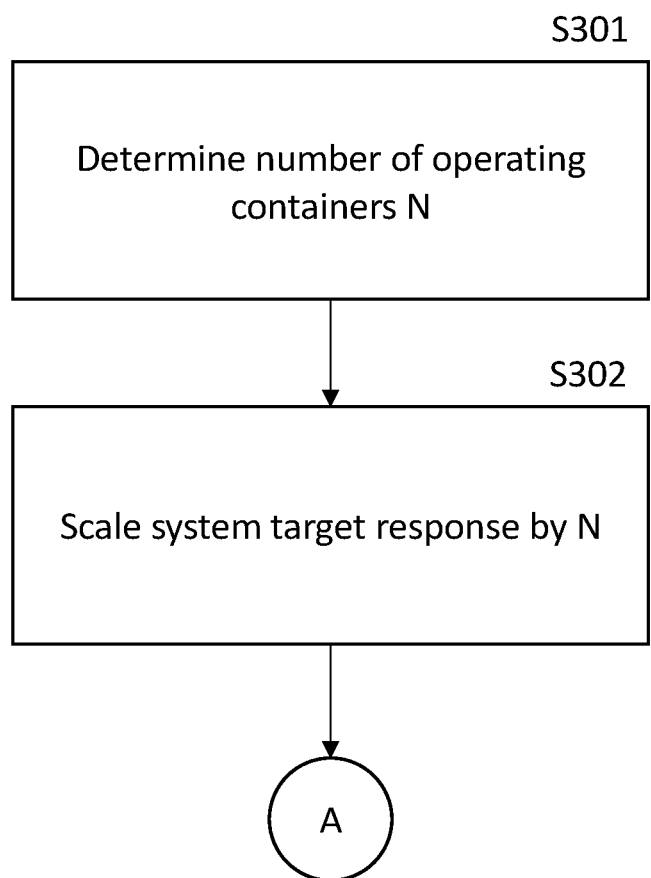
FIG. 3 shows an exemplary method for determining a state of charge of a container.

The present methods may be configured to assess the current situations in which the battery operate to provide a frequency response service, for example to take into account outages (e.g. when one or more containers fail) that have been declared to the grid. In some embodiments, it may be desirable to scale the response of the battery or individual containers of the battery based on the number of functioning containers, as shown in FIG. 3.

In an embodiment, the methods may be configured to ignore one or more containers in an outage due to a State of Charge Management Action. For example, the system target response may be scaled down, at S302, if the number of functioning containers is determined, at S301, to be less than the total number of containers. For example, the downscaling may be performed proportionate to the number of functioning containers, e.g. if 1 in 5 containers is in an outage, then the system target response is scaled down to 80%. In other embodiments, the downscaling may be performed using different ratios or weighting.

In an embodiment, the methods may be configured to ignore one or more containers that cannot deliver service due to a local withdrawn reason (or any other reasons). In this case, the system target response may again be proportionately scaled down, at S302, to the number of functioning or operating containers.

In some embodiments, a reference number or containers or an expected number of containers may be set, such that, if the number of operating containers is below this expected number of containers, the system target response is down-scaled, e.g., proportionate to the plurality of containers.

Techniques described herein enable a battery with a plurality of containers to operate efficiently based on the state of individual containers so as to provide appropriate frequency response to a power grid through tailoring the response of a container based on its current state with respect to other containers of the battery. As such, techniques described herein enable the battery to be operated effectively and reduce the likelihood of whole battery outage.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer read-able medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

It will be clear to one skilled in the art that many improvements and modifications can be made to the foregoing exemplary embodiments without departing from the scope of the present techniques.

The invention claimed is:

1. A computer-implemented method of operating a battery for responding to requests from a power grid for importing or exporting power to minimize frequency instability in the power grid, the battery comprising a plurality of containers each configured to store electrical energy, the method comprising, for a given container:

determining a target response for the given container by dividing a target response for the battery by the plurality of containers, a response being a rate and/or an amount of charge or discharge of the electrical energy to or from the given container or battery in response to a request from the power grid;

determining a container capacity by dividing a battery capacity by the plurality of containers;

determining a state-of-charge offset between an average state-of-charge across the plurality of containers and a state-of-charge of the given container;

determining a response adjustment by multiplying the container capacity by the state-of-charge offset; and determining a response for the given container by adjusting the target response by the response adjustment.

2. The method of claim 1, wherein determining a response adjustment further comprises a multiplication by a factor K.

3. The method of claim 2, wherein the factor K is determined by parameters of the battery.

4. The method of claim 2, wherein, when the response for the given container is above an upper limit or below a lower limit, the factor K is adjusted until a resulting response for the given container is within the upper and lower limits.

5. The method of claim 4, wherein the upper limit corresponds to a state at which the given container is fully charged, and/or the lower limit corresponds to a state at which the given container is fully discharged.

6. The method of claim 1, wherein the response for the given container comprises a rate at which the given container is charged or discharged, wherein a negative value of the response corresponds to charging while a positive value of the response corresponds to discharging.

7. The method of claim 1, further comprising first comparing a state-of-charge range of the plurality of containers with a predetermined threshold, wherein the state-of-charge range of the plurality of containers is determined by a difference between a highest state of charge and a lowest state of charge amongst the plurality of containers.

8. The method of claim 7, wherein, upon determining that the state-of-charge range of the plurality of containers is below the predetermined threshold, the response for every container of the plurality is set to be the same as for the given container.

9. The method of claim 7, wherein, upon determining that the state-of-charge range of the plurality of containers is above the predetermined threshold, the response for each container of the plurality of containers is set using the method.

10. The method of claim 1, wherein the state of charge of the given container is determined by averaging a plurality of instantaneous state-of-charge values of the given container measured at a predetermined time interval over a predetermined time period.

11. The method of claim 1, further comprising implementing an outage-handling strategy to scale the response for the given container when one or more containers of the plurality of containers fail.

12. The method of claim 11, wherein the outage-handling strategy comprises down adjusting the target response for the battery proportionate to a number of functioning containers.

13. The method of claim 1, further comprising setting an expected number of functioning containers and setting the target response for the battery based on the expected number of functioning containers, and, upon determining that the plurality of containers is below the expected number of functioning containers, down adjusting the system target response for the battery proportionate to the plurality of containers.

14. A non-transitory computer-readable medium comprising machine-readable code, which, when executed by a processor, causes the processor to perform the method of claim 1.

15. A control device for operating a battery for responding to requests from a power grid for importing or exporting power to minimize frequency instability in the power grid, the battery comprising a plurality of containers each configured to store electrical energy, the control device comprising:

at least one processor; and a non-transitory computer-readable medium having stored thereon software instructions that, when executed by the at least one processor, cause the control device to, for a given container:

determine a target response for the given container by dividing a target response for the battery by the plurality of containers, a response being a rate and/or an amount of charge or discharge of the electrical energy to or from the given container or battery in response to a request from the power grid;

determine a container capacity by dividing a battery capacity by the plurality of containers;

determine a state-of-charge offset between an average state-of-charge across the plurality of containers and a state-of-charge of the given container;

determine a response adjustment by multiplying the container capacity by the state-of-charge offset; and determine a response for the given container by adjusting the target response by the response adjustment.

16. The non-transitory computer-readable medium of claim 14, wherein the response adjustment further comprises a multiplication by a factor K, wherein when the response for the given container is above an upper limit or below a lower limit, the factor K is adjusted until a resulting response for the given container is within the upper and lower limits.

17. The non-transitory computer-readable medium of claim 14, wherein the response for the given container comprises a rate at which the given container is charged or discharged, wherein a negative value of the response corresponds to charging while a positive value of the response corresponds to discharging.

18. The control device of claim 15, wherein the response adjustment further comprises a multiplication by a factor K, wherein when the response for the given container is above an upper limit or below a lower limit, the factor K is adjusted until a resulting response for the given container is within the upper and lower limits.

19. The control device of claim 15, wherein the response for the given container comprises a rate at which the given container is charged or discharged, wherein a negative value of the response corresponds to charging while a positive value of the response corresponds to discharging.

20. The control device of claim 15, wherein the software instructions, when executed by the at least one processor, further cause the device to first compare a state-of-charge range of the plurality of containers with a predetermined threshold, wherein the state-of-charge range of the plurality of containers is determined by a difference between a highest state of charge and a lowest state of charge amongst the plurality of containers.

\* \* \* \* \*